J. G. VINCENT.
TRACTION WHEEL.
APPLICATION FILED NOV. 14, 1919.
1,384,170.
Patented July 12, 1921.
2 SHEETS—SHEET 1.
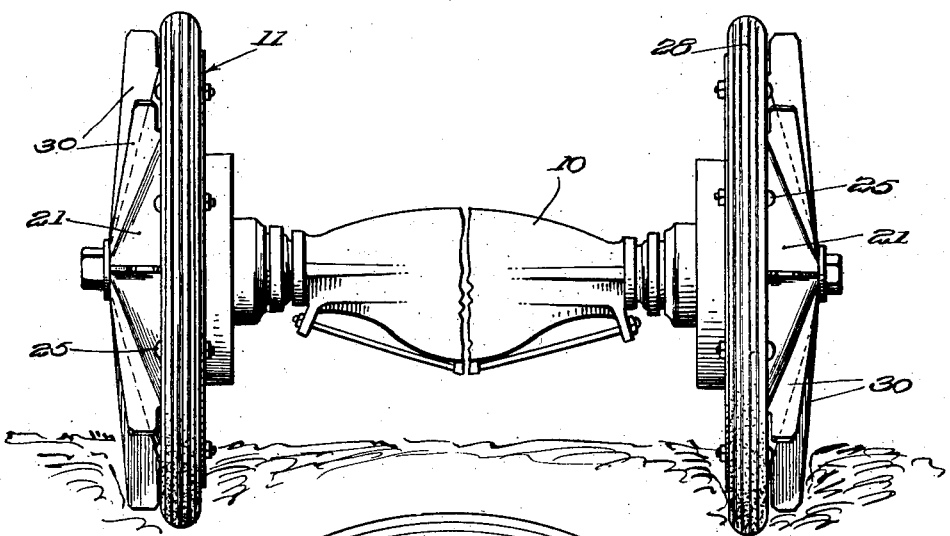
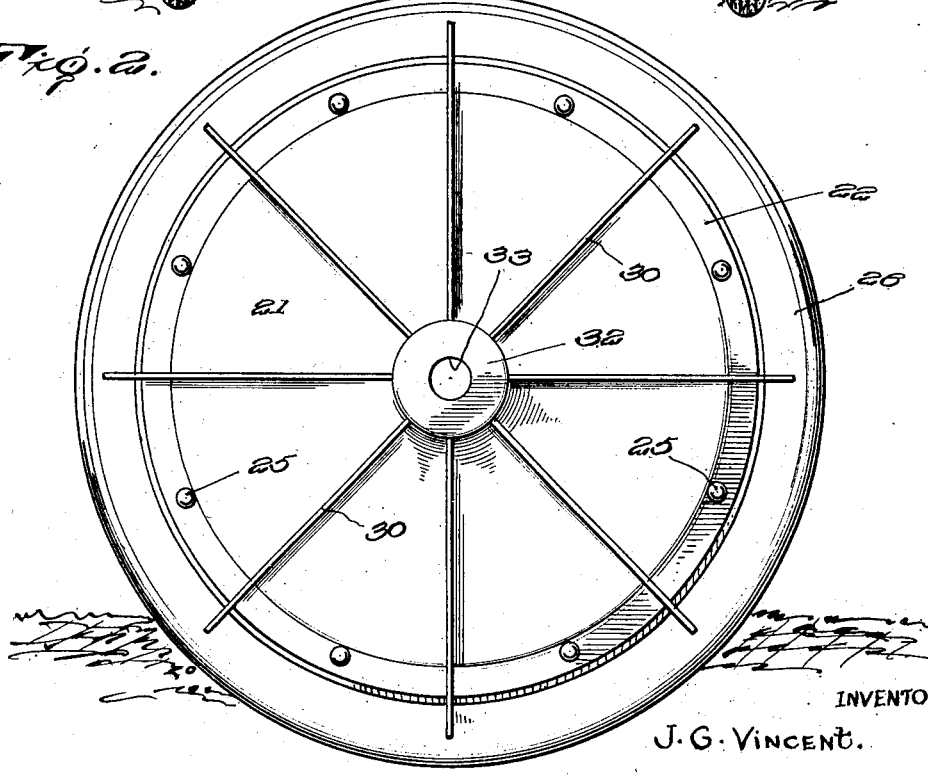
INVENTOR.
J. G. Vincent.

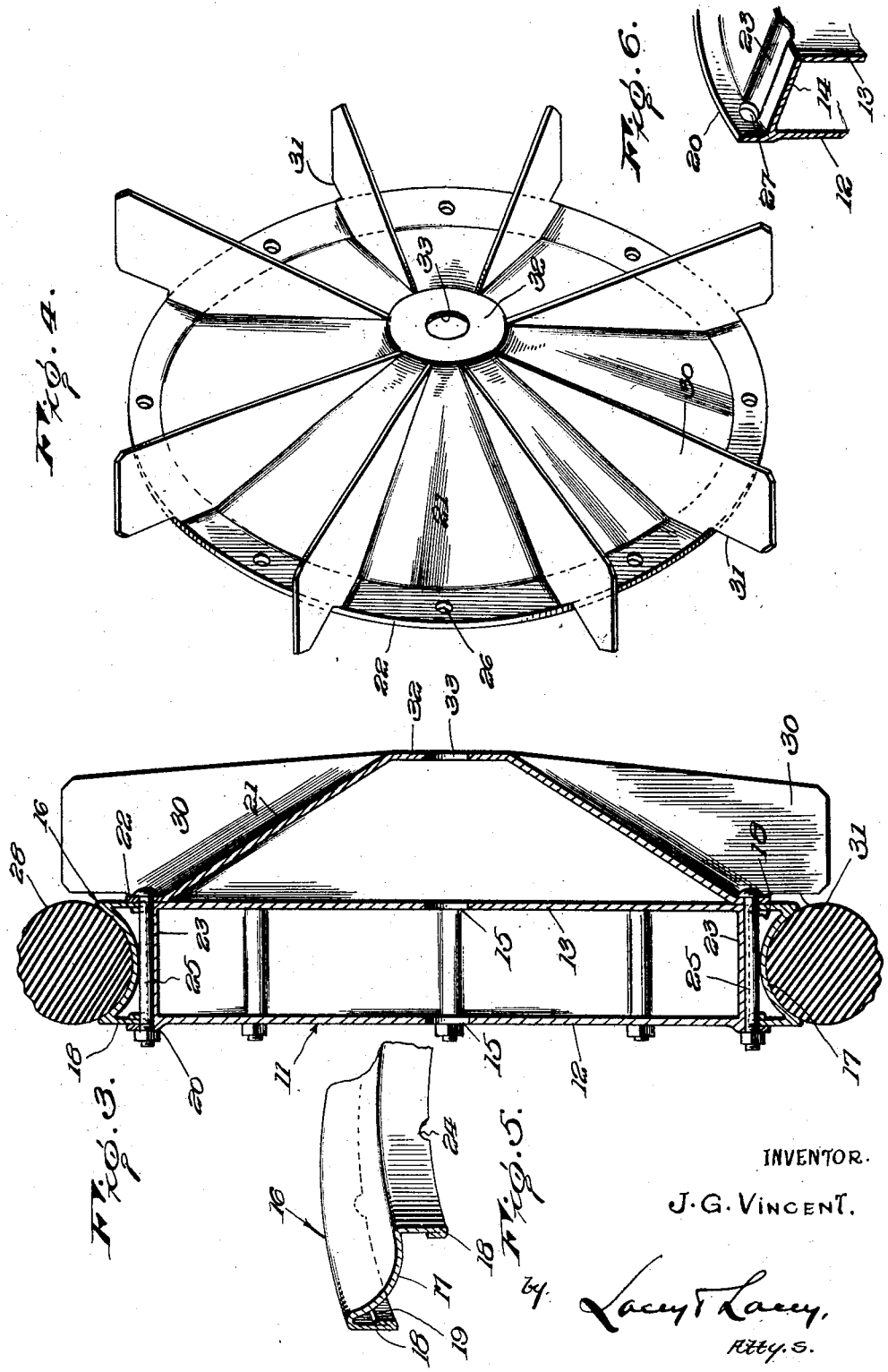

UNITED STATES PATENT OFFICE.

JOHN G. VINCENT, OF TULSA, OKLAHOMA.

TRACTION-WHEEL.

1,384,170.  Specification of Letters Patent.  Patented July 12, 1921.

Application filed November 14, 1919. Serial No. 337,944.

*To all whom it may concern:*

Be it known that I, JOHN G. VINCENT, a citizen of the United States, residing at Tulsa, in the county of Tulsa and State of Oklahoma, have invented certain new and useful Improvements in Traction-Wheels, of which the following is a specification.

This invention relates to improvements in traction wheels especially adapted for use on motor trucks, tractors and other vehicles.

An important object of this invention is to provide a traction wheel having a plurality of radial fins secured to one side and terminating adjacent the tread of the same whereby in the event of the vehicle to which the wheel is applied encountering a muddy or sandy road, the radial fins will be brought into contact with the ground for affording a positive grip between the wheel and the ground.

A further object of this invention is to provide a traction wheel having a plurality of radial fins mounted on a conical base plate having its apex extending outwardly from the wheel whereby said fins are tapered toward their inner ends to render the wheel self-cleaning to a high degree.

A further object of the invention is to provide a traction wheel having a plurality of radial fins terminating inwardly of the tread of the wheel so that the same will come into play only when the wheel becomes embedded in mud or sand.

A further object of the invention is to provide a wheel of the class described which is simple, efficient in use and comparatively cheap to manufacture. Other objects and advantages of the invention will be apparent during the course of the following description.

In the accompanying drawings forming a part of this application and in which like numerals are employed to designate like parts throughout the same:

Figure 1 is an end elevation of the improved traction wheel applied;

Fig. 2 is a side elevation of the same detached;

Fig. 3 is a vertical transverse section through the same;

Fig. 4 is a perspective of the traction device detached;

Fig. 5 is a fragmentary perspective of a rim embodied in the invention;

Fig. 6 is a fragmentary perspective of the wheel.

In the drawings wherein for the purpose of illustration is shown a preferred embodiment of the invention, the numeral 10 designates a rear axle housing of a truck, a pleasure vehicle, or a tractor as the case may be. As illustrated in Fig. 1, traction wheels generally designated by the numeral 11 are mounted on the axle (not shown) which extends longitudinally through the axle housing 10.

The improved traction wheel 11 includes disks 12 and 13 which are retained in spaced relation by an annular member 14 which functions as the felly of the wheel. As illustrated in Fig. 6, the fixed rim band 14 is intimately united with the outer edges of the disks 12 and 13 by welding or other suitable means. The disks 12 and 13 are provided with centrally arranged openings 15 through which driving axles of the truck may extend. As any suitable means may be employed for rigidly connecting the wheel to an axle whereby the wheel will rotate with the axle, detailed illustration and description of this feature is deemed unnecessary.

The rim which is adapted to be arranged about the fixed rim band 14 is designated generally by the numeral 16 and includes a transversely curved annular tire receiving portion 17 having inwardly extending flanges 18. The inwardly extending flanges 18 have their inner edge portions bent inwardly upon themselves as indicated at 19 for strengthening and reinforcing the rim against lateral and circumferential thrust. As illustrated in Fig. 3, the rim 16 is snugly arranged about the fixed rim band 14 and one flange 18 of the same engages a peripheral retaining flange 20 formed by extending the edge portion of the disk 12 beyond the fixed rim band 14 and offsetting the same laterally. When the rim 16 has been snugly arranged on the felly and engaged with the retaining flange 20 a conical base plate 21 of a diameter equal to the diameter of the wheel is arranged about the other side of the wheel and a peripheral flange 22 carried by the same is engaged with the other inwardly extending flange 18 of the rim. As will be noted from reference to Fig. 3, the flange 22 extends beyond the fixed rim of the wheel and engages the rim for securely retaining the same in position. The fixed rim band 14 is provided with a plurality of spaced transversely extending semi-circular recesses 23 with which pairs of spaced transversely extending semi-circular recesses 24 in the flanges 18 are adapted to register for the reception of retaining bolts 25. The retaining bolts 25 also extend through spaced openings 26 in the flanges 22 and through openings 27 in the retaining flange 20 whereby the rim is securely held on the fixed rim band and prevented from circumferential movement with relation to the fixed rim band.

It might be stated at this point that the rim 16 may be provided with a tread or tire element 28 which is seated in the inwardly curved annular member 17 of the rim.

The conical body plate 21 is provided with a plurality of radial fins or traction devices 30 which extend from a point adjacent the axis of the same and terminate beyond the flange 22. However, the radial fins 30 terminate inwardly of the tread portion of the tire 28 whereby the same are inwardly out of contact with the ground and are only engaged with the ground when the tire becomes embedded in mud or sand. The terminal portions of the radial fins 30 have their inner edges cut-away slightly as indicated at 31 so that contact between the fins and the rubber tire is prevented.

As illustrated in Figs. 3 and 4, the conical body 21 causes the fins to be tapered toward their inner ends whereby the traction device is rendered self-cleaning to a high degree. When the fins 30 come into play, the mud or sand is moved inwardly onto the inclined face of the base plate 21 and is therefore moved outwardly from the wheel. The base plate is provided with a centrally arranged flattened portion 32 which has a centrally arranged opening 33 for the reception of an axle.

In assembling the improved wheel, the rim 16 is first snugly arranged upon the felly and one flange 19 of the same is brought into contact with the retaining shoulder or flange 20. The conical base plate 21 is now arranged about the opposite side of the wheel and the flange 22 of the same is engaged with the other flange 18 of the rim. After the bolts 25 have been extended through the flange 22 and the annular shoulder 20, the rim 18 is locked against lateral displacement. The arrangement of the bolts 25 within the semi-circular recesses 23 and 24 secures the rim against circumferential movement with relation to the wheel.

The improved traction device herein illustrated and described has its fins 30 normally spaced from the ground whereby the traction between the wheel and the ground is normally through the tire 28.

It is to be understood that the form of the invention herewith shown and described is to be taken as a preferred embodiment of the same and that such minor changes may be made as will remain within the spirit of the invention and the scope of what is claimed.

Having thus described the invention, what is claimed as new is:

1. The combination with a wheel having a tread element, of a conical body secured to one side of said wheel and tapered from the rim portion of the wheel toward the axis thereof, and radial fins secured upon the face of said body and having their outer terminals adjacent said tread element.

2. The combination with a wheel having a tire, of a conical body plate arranged at one side of said wheel, and a plurality of radial traction devices secured to said conical body plate and being tapered inwardly.

3. The combination with a wheel, of a body plate having an attaching flange, and a plurality of radial fins secured to said body plate and being tapered toward their inner ends, said radial fins having their inner ends terminating adjacent the axis of said body plate.

4. The combination with a wheel having a tire, of a conical body plate arranged at one side of said tire and having an annular attaching flange, and a plurality of radial fins secured to said conical body plate and terminating inwardly of the tread of said tire, the inner end portions of said radial fins being tapered and terminating adjacent the axis of said conical body plate.

5. A traction device for wheels including a conical body plate having an annular flange, and a plurality of radial fins secured to the said body plate and extending beyond the flange of the same, said radial fins being tapered and terminating adjacent the axis of said body plate.

6. A traction device for wheels including a conical body plate, means to secure said body plate to a wheel, and a plurality of radial fins secured to the outer face of said body plate and extending beyond the same.

In testimony whereof I affix my signature.

JOHN G. VINCENT. [L. s.]